May 27, 1958     I. S. BRUMAGIM     2,836,440

SHAFT SEAL

Filed Jan. 20, 1955     2 Sheets-Sheet 1

INVENTOR
IVAN S. BRUMAGIM

BY *Harold T. Stowell*

ATTORNEY

May 27, 1958     I. S. BRUMAGIM     2,836,440
SHAFT SEAL

Filed Jan. 20, 1955     2 Sheets-Sheet 2

INVENTOR
IVAN S. BRUMAGIM

BY Harold T. Stowell
ATTORNEY

2,836,440

SHAFT SEAL

Ivan S. Brumagim, Warren, Pa.

Application January 20, 1955, Serial No. 483,064

6 Claims. (Cl. 286—11.15)

The present invention relates to a new and improved mechanical seal for a rotating shaft and more particularly and specifically to a mechanical seal of the carbon ring type which includes a sealing liquid arrangement for the carbon ring assembly.

Prior mechanical seal constructions for rotary shafts have generally included a stator assembly associated with the apparatus in which the shaft entry is to be sealed, which stator assembly includes a carbon ring having one flat or optically ground face, and a rotor assembly associated with and rotating with the shaft which includes a metallic ring having a flat or optically ground face rotating in contact with the similar face of the carbon ring.

Additionally, in most instances a double seal construction is used wherein a sealing chamber is provided around the shaft generally enclosing the rotor and stator assemblies and a sealing liquid is forced into the chamber under pressure to surround the rotor and partially penetrate between the cooperative sealing faces of the rotor and the stator.

In these prior constructions of the type generally noted, carbon, usually impregnated with a resinous or metallic material having lubricating qualities, has been used as the stator ring with exceptionally satisfactory wearing characteristics and sealing qualities. However, because of the low tensile and shear strength characteristics of carbon, it has been necessary to utilize carbon rings with excessive cross sectional dimensions in order to withstand the substantial pressures and stresses set up within the seal by deflection tendencies inherent in the constructions and by the high pressures in the apparatus to be sealed as well as the sealing liquids used to counteract the apparatus pressures.

It is, therefore, a general object of the present invention to provide a mechanical seal for rotary shafts which utilizes a carbon stator ring and which substantially eliminates all of the disadvantages and problems inherent in prior constructions.

A primary object of the present invention is to provide a mechanical seal for rotary shafts in which a carbon stator ring is utilized in the seal assembly and in which the support for the carbon ring permits the ring to be substantially pressurized in a balanced condition by the sealing liquid used in the seal thereby practically eliminating the stresses normally incident in such constructions.

Another object is to provide a novel and improved mechanical seal for rotary shafts which effectively provides a carbon ring construction in which the fluid pressures on the carbon ring are substantially balanced throughout the entire exterior area of the ring thereby permitting a substantial reduction in the heretofore excessive cross sectional dimensions of carbon rings which have been necessitated in order to resist said fluid pressures.

Another object is to provide a carbon ring seal construction for rotary shafts in which the pressures of the sealing liquids utilized in the seal are effectively balanced over substantially the entire exterior area of the carbon ring thereby minimizing the differential in pressures across the carbon ring and its cooperative metallic rotor ring.

Still a further object of the present invention is to provide a mechanical seal for a rotary shaft utilizing a carbon stator ring and a metallic rotor ring rotating in surface to surface contact with the carbon ring and wherein an O ring sealing member bears against one face of the carbon ring in close proximity to its contact with the rotor ring which includes a metallic ring support for the carbon ring effectively opposing deflection thereof by the O ring contact thereby maintaining the mating faces of the rotor and stator in effective sealing condition.

Still another object of the invention is to provide a mechanical seal including a carbon ring in the stator having surface to surface contact with a rotor ring in which the carbon ring support and assembly permits pressured sealing liquids to substantially surround the entire carbon ring on all sides and at both ends thereby maintaining the ring in a substantially balanced condition at all times and under all variations in pressure and operating stresses.

Still a further object of this invention is to provide a mechanical seal for rotary shafts in which there is effective control of all deflection and shear forces operating on the carbon stator ring thereby retaining the sealing faces of the stator and rotor rings in efficient sealing condition and at the same time greatly increasing the safety factor of the seal construction.

A still further object of the present invention is to provide a mechanical seal construction having the foregoing advantages and objects which produces a more effective and efficient construction resulting in a longer lasting and more durable seal and reducing the cost of operation through reduction in the necessity of repair and replacement of parts.

Still further objects and advantages of this invention will become readily evident to those skilled in the art when the following general statement and description are read in the light of the accompanying drawings.

The nature of the present invention may be stated in general terms as comprising a mechanical seal for a rotary shaft including apparatus to be sealed, a rotary shaft entering into said apparatus, a rotor on said shaft adjacent said apparatus, a sealing chamber surrounding said rotor, a sealing ring carried by said rotor adjacent said apparatus, a stator ring carried by said apparatus in surface to surface sealing contact with said rotor ring, a sealing liquid having communication through said chamber with said rotor, and support means for said stator ring whereby said sealing liquid substantially surrounds said stator ring on all sides thereof producing a balanced condition of pressures on said stator ring.

Referring now to the accompanying drawings in which like numerals designate similar parts throughout the several views.

The foregoing drawings and the hereinafter description thereof disclose the present invention as embodied in a double seal construction for a rotary shaft for the purposes of illustration and clarity only, and it is fully contemplated that the concepts of the present invention are equally applicable to single seal constructions and that their embodiment therein would not constitute a departure from the scope and intent of the present invention beyond the limitations established by the prior art and the hereinafter appended claims.

Figure 1:
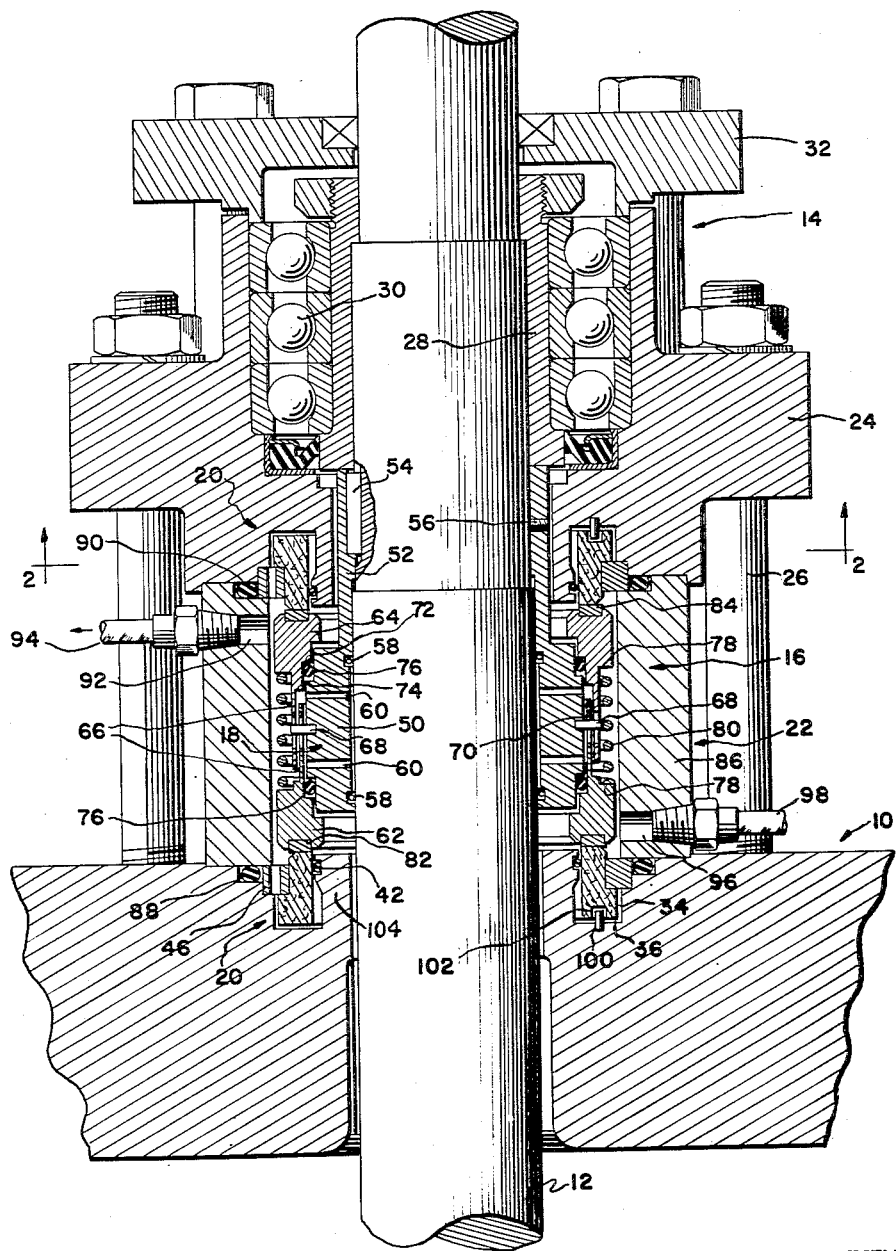
Fig. 1 is a longitudinal section through the seal construction constituting the present invention.
Figure 2:
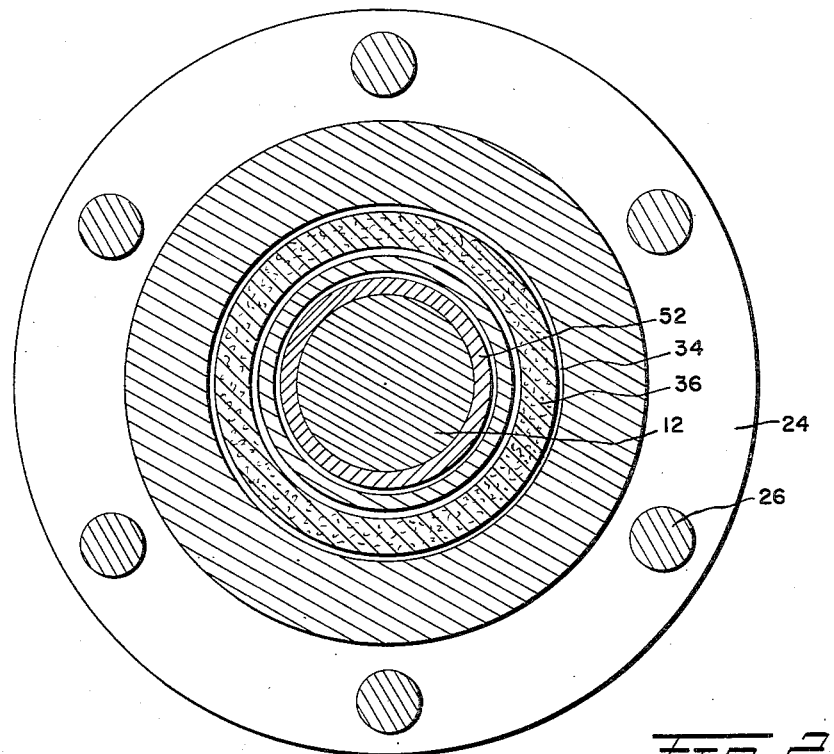
Fig. 2 is a transverse section taken on line 2—2 of Fig. 1.

Referring now in particular to Fig. 1 of the drawings, the present invention is shown to generally consist of an apparatus 10 taking the form of a wall of a pressure shell, a rotary shaft 12 extending through the wall of the apparatus, a thrust bearing assembly 14 on the shaft externally of the apparatus, and a mechanical seal 16 for the shaft where it enters the apparatus, the seal including a rotor construction 18, stator assemblies 20 and a sealing chamber or housing 22 for enclosing the rotor and stator components of the seal.

In the provision of a double seal construction of the type herein disclosed, a cylindrical bearing housing 24 is provided concentrically about the extended rotary shaft 12 being anchored by tie bolts 26 to the shell of the apparatus 10. The bearing housing 24 receives therein concentrically about the shaft a split bearing support 28 which in turn receives and supports within the housing a thrust bearing construction 30 which is retained therein by a tie-down collar 32 of conventional construction.

The mechanical seal 16 constituting the primary embodiment of the present invention is located concentrically about the shaft intermediate the outer wall of the apparatus 10 and the opposed face of the bearing housing 24 spaced therefrom. As has been noted, the present embodiment is disclosed as a double seal construction interposed between the apparatus and the bearing housing.

The outer wall of the apparatus 10 is provided concentrically about the shaft and shaft opening therein with a circular pocket 34 which is cut or machined into the wall for the reception therein of a carbon or the like stator ring 36. The circular pocket 34 is provided about its outer wall portion at a spaced distance inwardly from the outer face of the apparatus wall with a shoulder 38, and it is provided continuously about its inner wall 104 substantially opposite the shoulder 38 with a groove 40 which receives and retains a sealing O ring 42 therein.

The carbon stator ring 36 includes a circular ring of substantially rectangular cross section having a depth top to bottom substantially equal to the depth of the pocket 34 which is of a thickness laterally therethrough of a lesser dimension than the width of the pocket 34. The outer face of the carbon ring is provided with a cut-out portion continuously thereabout providing a shoulder 44 laterally thereof. The shoulder 44 receives the bottom end of a metallic ring 46 which is pressed or shrunk onto the carbon ring in the cutout portion thereof. The ring 46 provides an annular shoulder about the carbon ring which cooperates with shoulder 38 to locate the carbon ring laterally of the pocket at a spaced distance from the outer wall of the pocket and at the same time causing the inner face of the carbon ring to bear resiliently against the O ring 42 carried in the inner wall of the pocket 34.

The metallic ring 46 is provided at spaced points continuously thereabout with vertical passages 48 forming communication between the area exteriorly of the outer wall of the apparatus 10 and that region of the pocket 34 housing the lower or inner end of the carbon ring 36.

A similar construction as has been heretofore described is also provided in the face of the bearing housing 24 opposed to the outer face of the wall of the apparatus 10 thereby providing oppositely disposed or opposed stator carbon ring assemblies.

The rotor assembly 18 forming a part of the present seal includes an elongated tubular barrel 50 concentrically about the shaft 12 intermediate the apparatus 10 and the bearing housing 24 with a reduced extended end portion 52 of the barrel 50 extending upwardly for a spaced distance within the bearing housing 24 where it is keyed as at 54 to the shaft to provide for its rotation therewith. The extended end portion 52 of the barrel is additionally provided with a series of set screws 56 which lock the barrel against the shaft preventing movement of the barrel longitudinally of the shaft.

The portion of the barrel 50 intermediate the apparatus 10 and the bearing housing 24 is provided adjacent each end thereof with an O ring 58 and passages 60 extend through the barrel intermediate the O rings 58 providing communication between the inner face of the barrel adjacent the shaft and the area lying outside the outer face of the barrel.

Associated with the rotor barrel 50 is a pair of metallic or the like rotor rings 62 and 64 which are located generally one at each end of the barrel adjacent the outer face thereof. Each of the rings has an extended leg portion 66 which extends longitudinally of the barrel where the legs of each of the rings telescope and are anchored by pins 68, in the outer face of the barrel, engaging elongated slots 70 in the extended legs thereof. The inner face of each of the rings adjacent the ends of the barrel are provided with shoulders 72 cooperating with opposed shoulders 74 in the outer face of the barrel to locate and retain O rings 76 therebetween providing seals between the rotor rings and the ends of the barrel. The outer faces of the rotor rings 62 and 64 are provided with annular shoulders 78 in opposition between the two spaced rings forming cooperative seats for the reception of a coil spring 80 therebetween normally urging the rings apart.

Each of the rotor rings 62 and 64 is provided on its remote face with inset wear face members 82 and 84, rolled or otherwise secured in the faces of the rings and which wear members engage the outer faces of the carbon stator rings 36 carried by the apparatus 10 and the bearing housing 24. The wear members 82 and 84 are of a hard, friction-resisting material such as tungsten carbide or the like and their outer faces are ground and lapped to an optical flat similar to the ground outer faces of the carbon stator rings against which they bear under the resilient bias of the coil spring 80.

The sealing chamber 22 associated with the present seal includes a cylindrical housing 86 which is positioned between cooperative circular grooves formed in the opposed faces of the outer wall of the apparatus 10 and the bearing housing 24 concentrically about the shaft and rotor construction and outwardly from the pockets 34 in the apparatus wall and bearing housing. The housing 86 is provided with O ring seals 88 and 90 between its opposed ends and the apparatus wall and the bearing housing respectively thereby enclosing the rotor and stator assemblies and the shaft between the apparatus and the bearing housing in a tight liquid or vapor sealed condition.

The sealing chamber housing 86 is provided at one point therein with a port 96 providing communication therethrough for sealing liquid under pressure from an external source 98, and the housing is provided at a remote point thereto with a second port 92 communicating with a return line 94 to the source of sealing liquid whereby sealing liquid is continuously supplied to the interior of the housing to surround the several parts and components of the seal in a manner and for purposes to be hereinafter described.

To complete the seal assembly the bottom walls of the carbon ring pockets 34 are provided at one or more points therearound with upwardly projecting pins 100 which engage in detents 102 formed at spaced points about the bottom or inner faces of the carbon rings 36 retaining the rings against rotation in the pockets 34 and maintaining them stationary relative to the rotating rotor rings bearing against their outermost ends or faces.

The sealing liquid introduced into the sealing chamber housing 86 through port 96 will fill the chamber at all points to which the liquid has access, and the liquid will continue to circulate through all such points under pressure discharging through port 92 as described. By controlling the temperature of the sealing liquid, a cooling effect can also be achieved for the moving parts of the seal during operation. The cooling effect of the sealing liquid is of substantial importance when both high pressure and high temperature conditions are present in the pressure vessel. It has been found that the present seal is effective at temperatures in excess of 500°.

Figure 3:
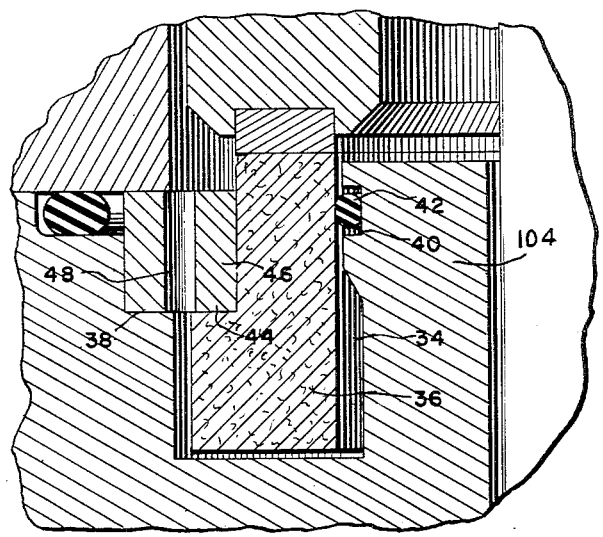
Fig. 3 is an enlarged fragmentary section of the stator ring assembly.

With particular reference to Figs. 1 and 3, it can be seen that the sealing liquid introduced into the sealing housing will have access to a portion of the circumferential area of the shaft intermediate the O rings 58 by reason of its flow in passages 60 in the rotor barrel 50. The O rings 58 will prevent the ingress of the sealing liquid inwardly of the apparatus or of the bearing housing and will at the same time prevent egress of any gases, vapors or liquids from within the apparatus housing. At the same time the sealing liquid has access to the cooperative sealing faces between the rotor rings and the carbon stator rings and will normally penetrate for a limited distance transversely of these mating faces and will at the same time pass through the passages 48 in the rings 46 of the stator assemblies to penetrate into the pockets 34 to surround the lower ends and bottom or inner ends of the carbon rings 36 on all sides thereof outwardly to the O rings 42 bearing against the inner faces of the carbon rings. The penetration of the sealing liquid under pressure into the pockets 34 subjects both the inside and outside diameters of the carbon rings to the pressure of the sealing liquid over substantially the entire depths of the rings below the sealing faces of the stator and rotor rings thereby permitting the use of a substantial working pressure without creating an unbalanced load on the carbon rings.

The net effective area of the stator rings in a plane transverse to the axis of the shaft 12 is the difference in area between the larger and the smaller surfaces of the stator rings. These surfaces are only those which lie in a plane transverse to the shaft 12. The net effective area of the rotor rings is determined in a like manner. Manifestly, it is only the surface areas of the rings which are normal to the axis of the shaft which are of any import when considering the net effective area because the other surfaces of the stator and rotor rings do not actually present a surface against which pressure is applied by the fluid in the system to maintain the desired sealing relationship.

In other words, the stator and rotor rings each have at least two surfaces of different projected areas transverse to the longitudinal axis of the shaft 12. The smaller of the surfaces of two of these associated rings cooperate in sealing relationship with each other while the larger surfaces are in opposed relationship, at the distal portion of their associated rings.

Also, it must be understood that with the net effective areas of both the stator and rotor rings being subjected to the same sealing fluid pressure, the degree of over-balance on each ring cross section in the direction of the rotor assembly 18 is directly proportional to the net effective area of the stator ring over that of the rotor ring.

This over-balancing is therefore transmitted as a shear force through the shoulder 44 of the carbon stator ring to its supporting metallic ring 46 at a point sufficiently remote to the critical cooperative sealing faces of the two rings so that normal load deflections will not cause any impairment of the efficiency of the seal between the faces.

Accordingly, a mechanical seal construction has been provided which utilizes a carbon stator ring so assembled and supported as to be substantially surrounded by the pressured sealing liquids whereby all excessive stresses are eliminated and an improved and more efficient seal is provided.

While the detailed description of the invention has been precisely described with reference to carbon stator rings, the seal of the invention may readily be employed with other types of rings, such as ceramic rings, as is well known in the art.

Having thus described and fully disclosed the novel construction and improved function inherent in the present invention, what is desired to be claimed is:

1. A seal for a rotary shaft comprising a housing disposed about said shaft, a rotor ring having a sealing surface supported by and for rotation with said shaft, a stator ring disposed within said housing, said stator ring having at least two surfaces of different projected areas transverse to the longitudinal axis of said shaft, the smaller of said stator ring surfaces cooperating in sealing relationship with the sealing surface of said rotor ring, and a source of pressure sealing fluid having communication with the cooperating surfaces of said rotor ring and said stator ring and also with the larger surface of said stator ring whereby the effective face on said stator ring created by the pressure sealing fluid is in the direction of the cooperating surfaces of said rotor ring and said stator ring.

2. In combination with a pressure fluid retaining wall and a rotary shaft extending therethrough, a mechanical seal for said shaft including a housing disposed about said shaft externally of said wall, a rotor ring supported by and for rotation with said shaft, said rotor ring having a sealing surface and an inner axial surface, O-ring sealing means disposed between the inner axial surface of said rotor ring and said shaft, a stator ring disposed within said housing, said stator ring having at least two surfaces of different projected areas transverse to the longitudinal axis of said shaft, the smaller of said surfaces cooperating in sealing engagement with the sealing surface of said rotor, O-ring sealing means disposed between said stator ring and said housing, and a source of pressure sealing fluid having communication with said cooperating surfaces of said rotor ring and said stator ring, and also with the larger surface of said stator ring whereby the effective force on said stator ring created by the pressure sealing fluid is in the direction of the cooperating surfaces of said rotor ring and said stator ring.

3. In combination with a pressure fluid retaining wall and a rotary shaft extending therethrough, a mechanical seal for such shaft including a housing concentrically disposed about said shaft and connected to the exterior of said fluid retaining wall, a circular pocket formed in the wall concentrically about said shaft within said housing, an annular shoulder formed in the outer axial wall of said pocket, a stator ring disposed within said pocket, said stator ring having at least two surfaces of different projected areas transverse to the longitudinal axis of said shaft, a perforated support member peripherally engaging said stator ring and seating on said pocket shoulder suspending said stator ring within said pocket, said perforated support member being perforated axially providing communication between the lower regions of said pocket below said stator ring and said housing interior above said stator ring, an O-ring disposed between the inner periphery of said stator ring and the wall of said pocket, a rotor ring supported by and for rotation with said shaft, said rotor ring having a sealing surface in sealing engagement with the smaller surface of said stator ring, O-ring means in sealing engagement between said rotor and said shaft, and a source of pressure sealing fluid having communication with the cooperating surfaces of said rotor ring and said stator ring and also with the larger surface of said stator ring whereby the effective force on said stator ring created by the pressure sealing fluid is in the direction of the cooperating surfaces of said rotor ring and said stator ring.

4. A seal construction as defined in claim 3 wherein the bottom wall of said pocket is provided with a plurality of projecting pins, and at least a portion of the larger surface of said stator ring is provided with a plurality of detents engageable with said projecting pins for retaining said stator ring against rotation in said pocket.

5. In combination with a fluid retaining wall and a rotary shaft extending therethrough, a mechanical seal for said shaft including, a circular pocket formed in said wall concentrically about said shaft and provided in its outer axial wall with an annular shoulder located intermediate the depth of said pocket, a circular carbon stator ring, having at least two surfaces of different projected areas transverse to the longitudinal axis of said shaft, a circular support member fixed about said stator ring and seating on said pocket shoulder suspending said stator ring within said pocket, an O-ring positioned between the inner axial wall of said stator ring and the inner axial wall of said pocket intermediate the depth of said pocket, a cylindrical barrel secured on said shaft outwardly of said wall, a rotor ring telescopically supported concentrically about said barrel in end to end engagement with said stator ring, said rotor ring being secured to said barrel for rotation therewith on said shaft, resilient means biasing said rotor ring toward and into sealing engagement with the smaller of the surfaces of said stator ring, O-ring sealing means between the inner axial face of said rotor ring and said shaft, a sealed housing connected to said wall concentrically enclosing said shaft and said sealing rings, said housing having communication with a source of pressure sealing fluid, and said stator ring support member having at least one perforation axially therethrough permitting flow of said sealing fluid into said recess whereby the effective force on said stator ring created by the pressure sealing fluid is in the direction of the engaging surfaces of said rotor ring and said stator ring.

6. In combination with a fluid retaining wall and a rotary shaft extending therethrough, a double mechanical seal for said shaft including a housing in sealing relationship with said wall and extending concentrically about said shaft for a predetermined distance outwardly from said wall, a seal disposed between said housing and said shaft at the extended end of said housing, circular pockets formed in said wall and in the extended end wall of said housing concentrically about said shaft, stator rings positioned concentrically within said pockets, perforated support members suspending said stator rings in said pockets, rotor rings carried by said shaft in end to end sealing engagement with each of said stator rings, and said perforated support members having communication with a source of pressure sealing fluid whereby the effective force on said stator rings created by the pressure sealing fluid is in the direction of the engaging surfaces of said rotor rings and said stator rings.

References Cited in the file of this patent

UNITED STATES PATENTS

| | | |
|---|---|---|
| 811,833 | Emmet | Feb. 6, 1906 |
| 1,307,815 | Fukao | June 24, 1919 |
| 2,329,990 | Hornschuch | Sept. 21, 1943 |
| 2,738,996 | Andersson | Mar. 29, 1956 |
| 2,741,991 | Disbrow | Apr. 17, 1956 |

FOREIGN PATENTS

| | | |
|---|---|---|
| 649,863 | Great Britain | Feb. 7, 1951 |

U. S. DEPARTMENT OF COMMERCE
PATENT OFFICE

CERTIFICATE OF CORRECTION

Patent No. 2,836,440     Ivan S. Brumagim     May 27, 1958

It is hereby certified that error appears in the printed specification of the above numbered patent requiring correction and that the said Letters Patent should read as corrected below.

Column 6, line 19, for "face" read -- force --.

Signed and sealed this 8th day of July 1958.

(SEAL)
Attest:
KARL H. AXLINE
Attesting Officer

ROBERT C. WATSON
Commissioner of Patents